(No Model.)
W. G. FLANDERS.
DENTAL TOOL STERILIZER.
No. 482,552. Patented Sept. 13, 1892.
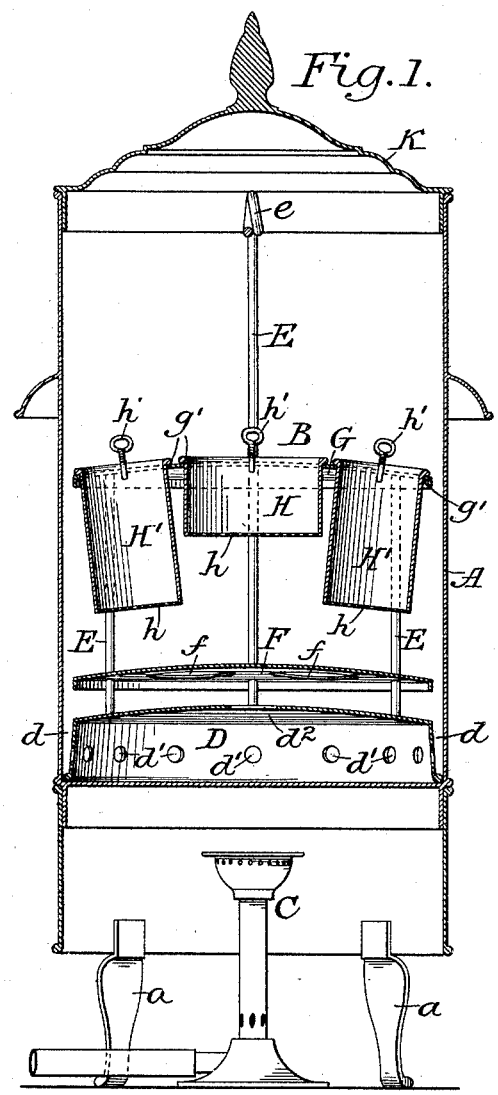
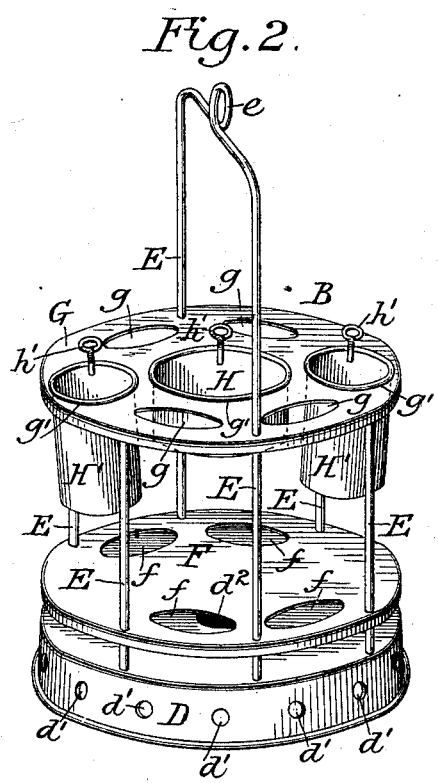
Attest:
A. N. Jenkins
A. Kidder.
Inventor:
William G. Flanders
by William B. Greeley
Atty.

UNITED STATES PATENT OFFICE.

WILLIAM G. FLANDERS, OF NEW YORK, N. Y.

DENTAL-TOOL STERILIZER.

SPECIFICATION forming part of Letters Patent No. 482,552, dated September 13, 1892.

Application filed February 9, 1892. Serial No. 420,833. (No model.)

*To all whom it may concern:*

Be it known that I, WILLIAM G. FLANDERS, of New York, in the county and State of New York, have invented a new and useful Sterilizer for Dental and other Instruments; and I do hereby declare that the following is a full and exact description thereof, reference being had to the accompanying drawings, and to the letters of reference marked thereon, making a part of this specification.

The use of boiling water for rendering dental or other surgical instruments aseptic is now known to be preferable to the use of steam, not only because the boiling water is itself a better and quicker antiseptic, but because it may be made to bring any desired chemical in solution into contact with the instruments, either for the purpose of increasing the antiseptic qualities of the water or prevent the rusting of the instruments, which is especially liable to occur when steam is used.

It is therefore the object of my invention to produce an apparatus in which the instruments may be submerged in the boiling water and from which they may be withdrawn readily and in which the water shall be kept in constant and rapid circulation for the purpose of more thoroughly cleansing the instruments.

The invention consists in the construction and combination of parts as hereinafter described and claimed.

In the accompanying drawings, Figure 1 is a vertical central section of the apparatus, and Fig. 2 is a perspective view of the stand or holder for the instruments.

The vessel A, of suitable size and shape, is adapted to receive the stand or holder B with the instruments and to keep the same submerged in boiling water. I have shown it as supported by legs $a\,a$ over a gas-burner C; but it might be heated by any other convenient means.

Upon the bottom of the vessel A rests an inverted cup D, which is adapted to be held centrally within the vessel, so as to leave a space $d$ between its sides and the sides of the vessel.

The sides of the cup are provided with perforations $d'\,d'$ and the top has a hole $d^2$, preferably about in the center.

The top of the cup D constitutes the base of the stand B, and upon the base are secured a series of vertical wires E E, which support, a short distance above the cup D, a disk F, and still higher up a second disk G.

The disk F has a series of openings $f\,f$, preferably near its circumference, and the disk G has openings $g\,g$, corresponding to the openings $f\,f$, and other openings $g'\,g'$. The latter openings are intended to receive and hold cups H H', which have perforated bottoms $h$.

Two of the wires E E may be extended above the disk G to form a loop $e$, which may be conveniently engaged by a hook for the purpose of withdrawing the stand from the water, and the cups H H' are also provided with eyes $h'$ for a like purpose.

A cover K may be fitted to the vessel A.

In the use of my improved sterilizer the longer instruments are placed in the openings $g\,g$ and $f\,f$ of the disks G and F, with their ends resting on the top of the inverted cup D. Those instruments which are too short to be thus supported are placed in the cups H' H', while burrs and other small pieces may be placed in the cup H. The stand is then placed in the boiling water in the vessel A and the water, heated by contact with the bottom of the vessel, rises through the aperture $d^2$, is deflected by the disk F, and passes through the holes $f\,f$ in the disk. It descends near the cooler walls of the vessel A, and through the perforations $d'\,d'$ re-enters the chamber within the cup D. A constant and rapid circulation is thus kept up with the result of cleansing the instruments thoroughly. When it is desired to remove the instruments, the entire stand may be withdrawn, and as the several disks are made crowning the water will run off completely and the heat of the stand and of instruments will dry all parts quickly. If any of the shorter tools alone are desired, the cup or cups containing them may be lifted readily out of the stand.

I have shown the apparatus as adapted for dental instruments; but it is obvious that the form and size of the apparatus might be varied to suit other instruments as well.

I claim as my invention—

1. The combination of a hot-water vessel and a stand for instruments, adapted to be placed therein, said stand being composed of a bottom plate, apertured disk above said plate, and supporting-wires, substantially as shown and described.

2. The combination of a hot-water vessel, a stand for instruments, adapted to be placed therein and having an apertured disk and supporting-wires, and a cup having a perforated bottom supported in the aperture in said disk, substantially as shown and described.

3. The combination of a hot-water vessel, an inverted cup placed centrally within said vessel to leave a space between itself and the walls of the vessel and having its sides and its top perforated, and a stand for supporting instruments above said cup, substantially as shown and described.

In testimony whereof I have signed my name to this specification in the presence of two subscribing witnesses.

WILLIAM G. FLANDERS.

Witnesses:
   EDWARD A. GREELEY,
   A. N. JESBERA.